UNITED STATES PATENT OFFICE.

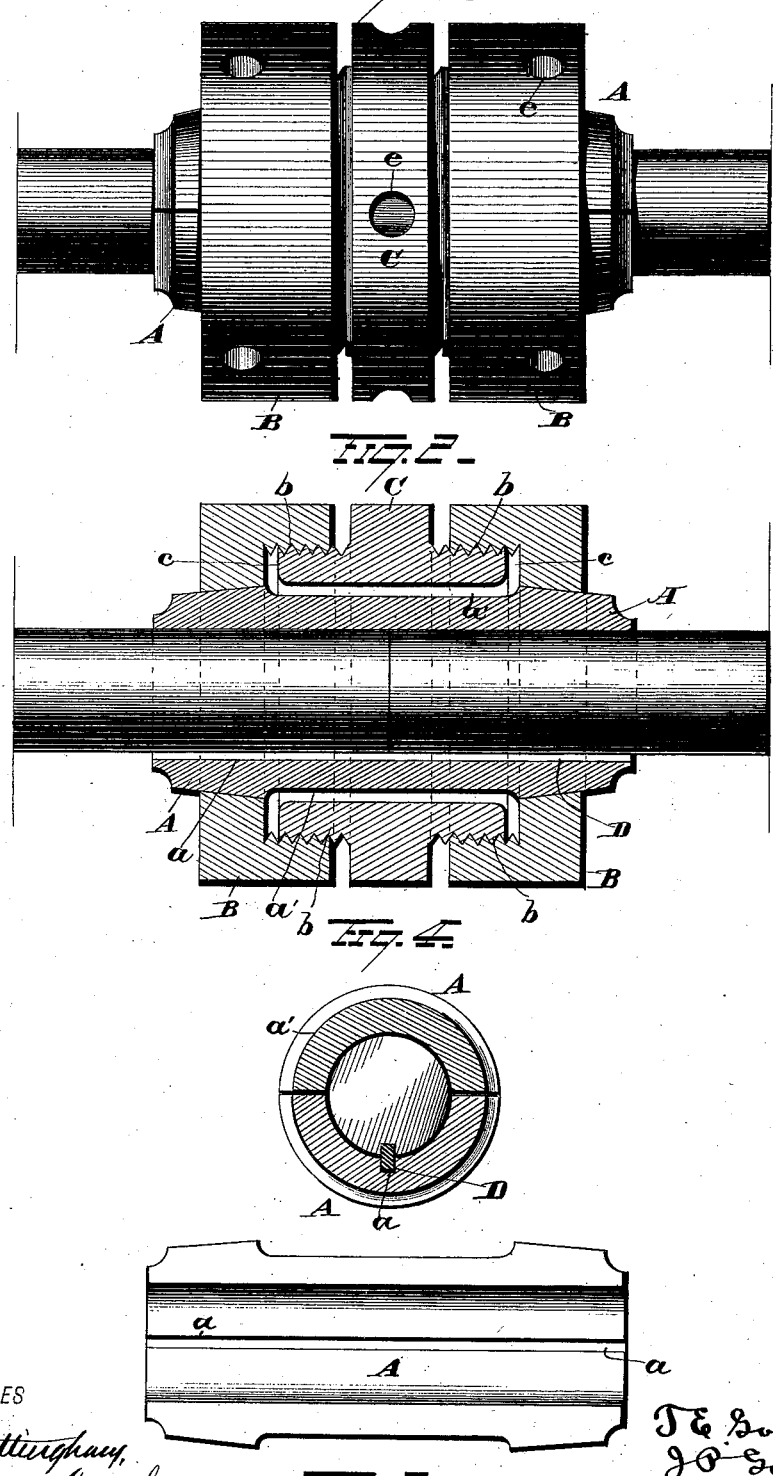

THEODORE EARNEST GOLDEN AND JOHN PORTER GOLDEN, OF COLUMBUS, GEORGIA.

SHAFT-COUPLING.

SPECIFICATION forming part of Letters Patent No. 297,985, dated May 6, 1884.

Application filed January 12, 1884. (No model.)

*To all whom it may concern:*

Be it known that we, THEODORE E. GOLDEN and JOHN P. GOLDEN, of Columbus, in the county of Muscogee and State of Georgia, have invented certain new and useful Improvements in Shaft-Couplings; and we do hereby declare the following to be a full, clear, and exact description of the invention, such as will enable others skilled in the art to which it appertains to make and use the same.

Our invention relates to an improvement in shaft-couplings, the object being to provide an effective, convenient, and quickly-adjustable device for joining the ends of two shafts.

With these ends in view our invention consists in a two-section cylindrical box or sleeve having cone-shaped ends and one of the sections provided internally with a key-seat, two conically-bored collars adapted to embrace the conical ends of the sleeve and provided with internally-threaded circular projections and a central collar adapted to loosely embrace the sleeve, and having externally-threaded circular projections which engage the internally-threaded collars and draw said collars toward one another, and thereby cause the sleeve-sections to tightly hug the shafts.

Our invention further consists in certain features of construction and combinations of parts, as will be fully described, and pointed out in the claims.

In the accompanying drawings, Figure 1 is a view in perspective of the coupling adjusted on the shafts. Fig. 2 is a longitudinal sectional view. Fig. 3 is a detached view of a sleeve-section, and Fig. 4 shows the key in position.

A represents two longitudinal box or sleeve sections, the bore of which, when the sections are put together, is slightly smaller than the shaft which it is to embrace. In the concave face of one of these sections the key-seat $a$ is formed. These box or sleeve sections are tapered toward the ends and provided with a slight recess, $a'$, about the middle, to allow the central collar, C, to turn freely on them when put together. The central collar, C, provided with two laterally-extending circular projections, $c$, one having a right-hand and the other a left-hand screw-thread on its outer surface, is bored sufficiently large to slip readily over either end of the box or sleeve and turn freely about the middle portion of said box. The collars B are each provided with a conical-shaped bore sufficiently large to closely embrace the tapering ends of the box A, and are further provided with projections on the sides toward the central collar, which have enlarged bores $b$, threaded on their internal surfaces to correspond with and engage the threaded projections on the central collar. The central collar, C, is preferably provided with four spanner-holes, $e$, and the collars B with two each. The ends of the shafts are grooved or slotted to receive the key or keys D. This key extends outward from the surface of the shaft, and is constructed to be received in the chamber or key-seat $a$.

Two shafts are coupled in the following manner: Slip the collars B and C over the ends of the shafts to be coupled in the order of their respective positions. Bring the ends of the shafts together and place the key or keys in position. Then place the box-sections in position and bring the collars B in contact with the central collars, C. By means of a spanner in one of the holes in each collar B to keep the shaft from turning, and a spanner in one of the holes in C to turn the same, the collars B are drawn toward the center by the screw-threads on the projections $c$ in contact with the corresponding threads on $b$, and the box-sections are thus pressed tightly against the ends of the shafts and hold the same with great firmness.

The advantages of this coupling appear in its security against working loose, the great strength obtained with a small amount of metal, and the facility with which it is adjusted.

Having fully described our invention, what we claim as new, and desire to secure by Letters Patent, is—

1. In a shaft-coupling, the combination, with a sectional box for embracing adjacent ends of the sections of the shaft and having tapering ends, as shown, of two end collars resting on the tapering ends of the sleeve and provided with the internally-threaded projections, and a central collar having threaded extensions on the end collars, whereby both end collars are simultaneously moved by the central collar, substantially as set forth.

2. In a shaft-coupling, the combination, with a box, A, adapted to be keyed to a sectional shaft, of the end collars, B, having tapering bores and the internally-threaded projections, and the central collar provided with screw-threaded lateral extensions, which latter engage the threaded projections of the end collars, substantially as set forth.

In testimony whereof we have signed this specification in the presence of two subscribing witnesses.

THEODORE EARNEST GOLDEN.
JOHN PORTER GOLDEN.

Witnesses:
T. W. BATES,
A. O. BLACKMAR.